United States Patent
Ström et al.

(10) Patent No.: US 11,924,416 B2
(45) Date of Patent: Mar. 5, 2024

(54) COMBINED LOOP FILTERING FOR IMAGE PROCESSING

(71) Applicant: Telefonaktiebolaget LM Ericsson (publ), Stockholm (SE)

(72) Inventors: Jacob Ström, Stockholm (SE); Per Wennersten, Årsta (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 92 days.

(21) Appl. No.: 17/620,981

(22) PCT Filed: Jun. 24, 2020

(86) PCT No.: PCT/EP2020/067746
§ 371 (c)(1),
(2) Date: Dec. 20, 2021

(87) PCT Pub. No.: WO2020/260415
PCT Pub. Date: Dec. 30, 2020

(65) Prior Publication Data
US 2022/0329791 A1 Oct. 13, 2022

Related U.S. Application Data
(60) Provisional application No. 62/865,533, filed on Jun. 24, 2019.

(51) Int. Cl.
*H04N 19/117* (2014.01)
*H04N 19/119* (2014.01)
(Continued)

(52) U.S. Cl.
CPC ......... *H04N 19/117* (2014.11); *H04N 19/119* (2014.11); *H04N 19/1883* (2014.11);
(Continued)

(58) Field of Classification Search
CPC ...... H04N 19/85; H04N 19/82; H04N 19/463; H04N 19/1883; H04N 19/119; H04N 19/117
See application file for complete search history.

(56) References Cited

U.S. PATENT DOCUMENTS
2017/0339432 A1  11/2017  Chao et al.
2019/0082176 A1  3/2019  Zhang et al.

FOREIGN PATENT DOCUMENTS
WO   2016146158 A1   9/2016

OTHER PUBLICATIONS
Bross, B. et al., "Versatile Video Coding (Draft 4)", Joint Video Experts Team (JVET) of ITU-T SG 16 WP 3 and ISO/IEC JTC 1/SC 29/WG 11 13th Meeting, Jan. 9-18, 2019, pp. 1-297, Marrakech, MA, JVET-M1001-v6.
(Continued)

*Primary Examiner* — On S Mung
(74) *Attorney, Agent, or Firm* — COATS & BENNETT, PLLC

(57) ABSTRACT
In an image processing device (i.e. encoder or decoder), the number of loop filter stages is lowered by combining bilateral loop filtering (or Hadamard loop filtering) with either sample Adaptive Offset Filtering (SAO) or Adaptive Loop Filtering (ALF). This avoids the implementation problems associated with too many loop filter stages and provides approximately the same compression efficiency gain as having separate loop filter stages.

18 Claims, 11 Drawing Sheets

(51) Int. Cl.
H04N 19/169 (2014.01)
H04N 19/463 (2014.01)
H04N 19/82 (2014.01)
H04N 19/85 (2014.01)

(52) U.S. Cl.
CPC .......... *H04N 19/463* (2014.11); *H04N 19/82* (2014.11); *H04N 19/85* (2014.11)

(56) References Cited

OTHER PUBLICATIONS

Strom, J. et al., "CE1-related: Multiplication-free bilateral loop filter", Joint Video Experts Team (JVET) of ITU-T SG 16 WP 3 and ISO/IEC JTC 1/SC 29/WG 11 14th Meeting, Mar. 19-27, 2019, pp. 1-7, Geneva, CH, JVET-N0493.
Strom, J. et al., "CE1: Bilateral filter tests", Joint Video Experts Team (JVET) of ITU-T SG 16 WP 3 and ISO/IEC JTC 1/SC 29/WG 11 14th Meeting, Mar. 19-27, 2019, pp. 1-18, Geneva, CH, JVET-N0489_v2.
Bross, B. et al., "Versatile Video Coding (Draft 4)", Joint Video Experts Team (JVET) of ITU-T SG 16 WP 3 and ISO/IEC JTC 1/SC 29/WG 11 13th Meeting, Jan. 9-18, 2019, pp. 1-285, Marrakech, MA, JVET-M1001-v5.
Ikonin, S. et al., "CE1: Hadamard transform domain filter (CE1-2)", Joint Video Experts Team (JVET) of ITU-T SG 16 WP 3 and ISO/IEC JTC 1/SC 29/WG 11 14th Meeting, Mar. 19-27, 2019, pp. 1-16, Geneva, CH, JVET-N0478-v3.
Bross, B. et al., "Versatile Video Coding (Draft 4)", Joint Video Experts Team (JVET) of ITU-T SG 16 WP 3 and ISO/IEC JTC 1/SC 29/WG 11 13th Meeting, Jan. 9-18, 2019, pp. 1-300, Marrakech, MA, JVET-M1001-v7.
Konin, S., et al., "Non-CE: Hadamard transform domain filter", Joint Video Experts Team (JVET) of ITU-T SG 16 WP 3 and ISO/IEC JTC 1/SC 29/WG 11 13th Meeting, Jan. 9-18, 2019, pp. 1-7, Marrakech, MA, JVET-M0468.
Bross, B. et al., "Versatile Video Coding (Draft 3)", Joint Video Experts Team (JVET) of ITU-T SG 16 WP 3 and ISO/IEC JTC 1/SC 29/WG 11 12the Meeting, Oct. 3-12, 2018, pp. 1-234, Macao, CN, JVET-L1001-v9.
Strom, J., "Non-CE: Reduced complexity bilateral filtering", Joint Video Experts Team (JVET) of ITU-T SG 16 WP 3 and ISO/IEC JTC 1/SC 29/WG 11 13th Meeting, Jan. 9-18, 2019, pp. 1-3, Marrakech, MA, JVET-M0885_v2.
Strom, J., "Non-CE: Reduced complexity bilateral filtering", Joint Video Experts Team (JVET) of ITU-T SG 16 WP 3 and ISO/IEC JTC 1/SC 29/WG 11 13th Meeting, Jan. 9-18, 2019, pp. 1-3, Marrakech, MA, JVET-M0885_v3.
Strom, J. et al., "CE2 related: Reduced complexity bilater filter", Joint Video Experts Team (JVET) of ITU-T SG 16 WP 3 and ISO/IEC JTC 1/SC 29/WG 11 11th Meeting, Jul. 10-18, 2018, pp. 1-13, Ljubljana, SI, JVET-K0274_v4.
Strom, J. et al., "AHG 2 related: Reduced complexity bilateral filter", oint Video Experts Team (JVET) of ITU-T SG 16 WP 3 and ISO/IEC JTC 1/SC 29/WG 11 11th Meeting, Jul. 10-18, 2018, pp. 1-9, Ljubljana, SI, JVET-K0274_v1.
Strom, J. et al., "Bilateral Loop Filter in Combination with SAO", 2019 Picture Coding Symposium (PCS), Nov. 12-15, 2019, pp. 1-5, Ningbo, CH.
Wennersten, P. et al., "Bilateral Filtering for Video Coding", IEEE Visual Communications and Image Processing (VCIP), Dec. 10-13, 2017, pp. 1-4, St. Petersburg, US.
Strom, J. et al., "CE1-related: Multiplication-free bilateral loop filter", Joint Video Experts Team (JVET) of ITU-T SG 16 WP 3 and ISO/IEC JTC 1/SC 29/WG 11 14th Meeting, Mar. 19-27, 2019, pp. 1-8, Geneva, CH, JVET-N0493-v2.
Strom, J. et al., "Combined bilateral SAO loop filter", Joint Video Experts Team (JVET) of ITU-T SG 16 WP 3 and ISO/IEC JTC 1/SC 29/WG 11 15th Meeting, Jul. 3-12, 2019, pp. 1-6, Gothenburg, SE, JVET-O0548.

COMBINED LOOP FILTERING FOR IMAGE PROCESSING

TECHNICAL FIELD

The present invention relates generally to image and video processing, and in particular to a system and method of combining loop filtering operations on image data.

BACKGROUND

Technology—particularly the advent of sophisticated wireless mobile communication devices, most of which include one or more cameras—has made digital imagery ubiquitous to daily life in many parts of the world. Video is prevalent, not only from traditional sources such as broadcast and cable television distribution systems, but also on computers, tablet devices, smartphones, and even wristwatches. Additionally, sources of news and entertainment, and social media networks that are redefining interpersonal communities, are rife with high-resolution color digital images. The sheer volume of imagery has been a driving factor in the development of state of the art network technology, digital storage, and camera and display technology.

Image processing algorithms, as well as dedicated image processing hardware, have advanced significantly. Yet even with ongoing advances in the bandwidth and data speeds of networks, the capacity of storage devices, and the like, intelligently processing digital images to reduce their storage size, and facilitate their efficient transfer across networks, remains an important area of research and development. This refers both to individual images and video, which consists of sequences of individual images.

When viewed on a screen, an image (whether a still image or a video frame) consists of pixels, each pixel having a red, green, and blue value (RGB). However, when encoding and decoding a video sequence, the image is often not represented using RGB but typically in another color space. Common image color spaces include (but are not limited to), YCbCr; ICtCp; and variations of these, such as non-constant-luminance YCbCr and constant luminance YCbCr. Considering the example of YCbCr, it includes three components: Luma (Y) and blue-difference (Cb) and red-difference (Cr) chroma components. The Y component, which roughly represents luminance, or intensity, is of full resolution, whereas the chroma components Cb and Cr often are of a smaller resolution. A typical example is a high definition (HD) video sequence containing 1920×1080 RGB pixels, which is often represented with a 1920×1080 resolution Y component, a 960×540 Cb component and a 960×540 Cr component. The elements in the components are called samples. In the HD video example, there are therefore 1920×1080 samples in the Y component, and hence a direct relationship between samples and pixels. In this case, the terms pixels and samples are synonymous, and may be used interchangeably. For the Cb and Cr components, there is no direct relationship between samples and pixels; a single Cb sample typically influences several pixels.

In many video coding standards, the components Y, Cb, and Cr are further partitioned into blocks. As an example, in Advanced Video Coding (AVC) the image is partitioned into macroblocks of 16×16 Y samples and 8×8 Cb and Cr samples representing the same 16×16 pixel area.

In High Efficiency Video Coding (HEVC), the image is partitioned into Coding Tree Units (CTUs). A CTU consists of an N×N block of luma samples, M×M chroma samples for Cb, and M×M chroma samples for Cr. As one example, N=64 and M=32. The CTU can be partitioned into four square blocks, each of which can in turn be partitioned into four square blocks, recursively. This forms a partitioning tree, with the CTU as root and square blocks called Coding Units (CUs) as leaves.

In the Versatile Video Coding (VVC) standard, the image is partitioned into Coding Tree Units (CTUs). A CTU consists of an N×N block of luma samples, M×M chroma samples for Cb, and M×M chroma samples for Cr. As a typical example, N=128 and M=64. Just as in the case for HEVC, the CTUs can then be partitioned into smaller blocks; however, these do not have to be squares. As an example, a block can be partitioned into two smaller blocks using a horizontal partition, where the partitioned blocks have the same width as the original block but half the height. This partitioning can go on recursively, forming a partition tree where the CTU is the root and the blocks at the leaves are called Coding Units (CUs). These CUs can be further partitioned into Transform Units, or TUs. In the decoder, the samples of a TU are first predicted, either by using samples from a previously decoded block in the same image (intra prediction), or using samples from a block in a previously decoded image (inter prediction), or a combination of the two.

It is known in the art that bilateral filtering of image data, directly after forming a reconstructed image block, can be beneficial for video compression, as described by P. Wennersten, J. Ström, Y. Wang, K. Andersson, R. Sjöberg, and J. Enhorn, in "Bilateral Filtering for Video Coding," published in IEEE Visual Communications and Image Processing (VCIP), December 2017, available at http://www.jacob-strom.com/publications/Wennersten et al VCIP2017.pdf the disclosure of which is incorporated herein by reference in its entirety. Wennersten et al. showed that it is possible to reduce the bit rate, with maintained visual quality, using the bilateral filter. The Bjontegaard Metric provides a means to compare codecs or encoding techniques on the same data, and yields a metric called the BD-rate, where a negative delta-BD-rate figure of −1% means that the bit rate has been reduced by 1%, while maintaining the same visual quality. For the filter in Wennersten's paper, the delta-BD rate was −0.5% for a run-time increase of 3% (encode) and 0% (decode) for random access. The run time is the time it takes to encode or decode a sequence, and a low run time increase is desirable. Since the filtering in this case happens directly after block reconstruction, this type of bilateral filtering is referred to herein as "post reconstruction bilateral filtering."

Another approach to filtering directly after forming the reconstructed block is to delay filtering until the entire image has been reconstructed, at which point the entire image (or parts of it) can be filtered. This method is described by J. Ström, P. Wennersten, J. Enhorn, and R. Sjöberg, in the standardization contribution, "CEb1-related: Multiplication-free bilateral loop filter," published as JVET-N0493, at the 14th JVET Meeting: Geneva, CH, 19-27 Mar. 2019, downloadable as zip file from http://phenixit-sudparis.eu/jvet/doc_end_user/documents/14_Geneva/wg11/JVET-N0493-v4.zip the disclosure of which is incorporated herein by reference in its entirety. Such filtering schemes are typically referred to as loop filters, or in-loop filters, since the result of the filtering is looped back for prediction of frames that are yet to be encoded/decoded. Accordingly, this type of bilateral filtering is referred to herein as "bilateral loop filtering."

As an alternative to the bilateral filter, it is also possible to filter in the Hadamard domain, as described by S. Ikonin, V. Stepin, A. Karabutov, and J. Chen in the standardization contribution, "CE1: Hadamard transform domain filter (CE1-2)," published as JVET-N0478, at the 14th JVET Meeting: Geneva, CH, 19-27 Mar. 2019, downloadable as zip file from http://phenix.it-sudparis.eu/jvet/doc_end_user/documents/14_Geneva/wg11/JVET-N0478-v3.zip the disclosure of which is incorporated herein by reference in its entirety. Hadamard domain filtering can be done either directly after reconstructing each block (post-reconstruction Hadamard filtering) or as a loop filter (Hadamard loop filtering), as in the case with the bilateral filter.

Both post-reconstruction filtering and loop filtering have drawbacks. In the case of post-reconstruction filtering, undesirable latency is introduced from the point where the unfiltered samples are produced, to the point where they have been filtered. This is problematic since the filtered samples can be needed for prediction of the neighboring block. One known technique to minimize this disadvantage is to avoid filtering small blocks, and avoid the use of pixels outside the block. This was described by J. Ström, P. Wennersten, J. Enhorn, K. Reuze, D. Rusanovskyy, and M. Karczewicz in the standardization contribution "CE1: Bilateral filter tests," published as JVET-N0489, at the 14th JVET Meeting: Geneva, CH, 19-27 Mar. 2019, downloadable as zip file from http://phenixit-sudparis.eu/jvet/doc_end_user/documents/14_Geneva/wg11/JVET-N0489-v2.zip the disclosure of which is incorporated herein by reference in its entirety. Unfortunately, however, this lowers compression efficiency in terms of BD-rate to about −0.35%, down from −0.5% (note that larger negative numbers indicate better compression efficiency).

Loop filtering can get better gains, e.g., around −0.65%, but introduces another deficiency in that it comprises a separate stage, where all samples must be touched. Draft 5.0 of the VVC standard already contains three loop-filters; a deblocking filter, a filter called Sample Adaptive Offset (SAO) and a filter called Adaptive Loop Filter (ALF). Having many sequential filters can make hardware implementation difficult, since they are typically applied at least partly in parallel. As a simplified example, since the image is reconstructed from top to bottom, it is possible to start performing SAO filtering on the top half of the image once that has been reconstructed. Once this is finished, SAO filtering of the bottom half can happen in parallel with ALF filtering of the top half. Finally, the bottom half of the image is processed with ALF. This works well to save time if the filtering takes about the same time for both halves. However, it may be the case that SAO is very slow to process the top half of the image where ALF is very fast, or vice versa. If this happens, it may be the case that almost no time saving is possible, and the implementation must speed up ALF and SAO individually, which is typically expensive in terms of silicon surface area.

It should be understood that with more loop filters, this situation gets worse. It is therefore questionable whether the gain in compression efficiency provided by bilateral loop filtering is worth the extra implementation costs.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

The following papers present additional background information, and are incorporated herein by reference in their entireties:

J. Ström, "Non-CE: Reduced complexity bilateral filter", JVET-M0885, 13th JVET Meeting, Marrakech, Marocco, 9-18 Jan. 2019. Paper downloadable as a zip file from http://phenix.it-sudparis.eu/jvet/doc_end_user/documents/13_Marrakech/wg11/JVET-M0885-v4.zip J. Ström, P. Wennersten, J. Enhorn, D. Liu, K. Andersson, R. Sjöberg, "CE2 related: Reduced complexity bilateral filter", JVET-K0274, 11th JVET Meeting, Ljubljana, Slovenia, 10-18 Jul. 2018. Paper downloadable as a zip file from http://phenix.it-sudparis.eu/jvet/doc_end_user/documents/11_Ljubljana/wg11/JVET-K0274-v5.zip S. Ikonin, V. Stepin, J. Chen, "Non-CE: Hadamard transform domain filter", JVET-M0468, 13th JVET Meeting, Marrakech, Marocco, 9-18 Jan. 2019. Paper downloadable as a zip file from http://phenix.it-sudparis.eu/jvet/doc_end_user/documents/13_Marrakech/wg11/JVET-M0468-v2.zip

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, the number of loop filter stages is lowered by combining bilateral loop filtering (or Hadamard loop filtering) with either sample Adaptive Offset Filtering (SAO) or Adaptive Loop Filtering (ALF). This avoids the implementation problem associated with too many loop filter stages and provides approximately the same compression efficiency gain as having separate loop filter stages.

One embodiment relates to a method of applying a plurality of disparate filter operations to image data. The image data are partitioned into one or more partitions. For each partition of the image data, a first filtering operation is applied to the current partition of the image data to generate one of first filtered image data and first delta data; a second filtering operation is applied to the current partition of the image data to generate one of second filtered image data and second delta data; the outputs of the first and second filtering operations for the current partition are combined to generate combined filtered image data; and the combined filtered image data for the current partition are clipped.

Another embodiment relates to an image processing device adapted to apply a plurality of disparate filter operations to image data. The image processing device includes a processor adapted to partition the image data into one or more partitions. For each partition of the image data, the processor is adapted to: apply a first filtering operation to the current partition of the image data to generate one of first filtered image data and first delta data; apply a second filtering operation to the current partition of the image data to generate one of second filtered image data and second delta data; combine the outputs of the first and second filtering operations for the current partition to generate combined filtered image data; and clip the combined filtered image data for the current partition.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

This application claims priority to U.S. Application No. 62/865,533, filed 24 Jun. 2019, the disclosure of which is incorporated herein by reference in its entirety.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention. Although at least some of the embodiments herein may be described as applicable in certain contexts and/or wireless network types for illustrative purposes, the embodiments are similarly applicable in other contexts and/or wireless network types not explicitly described.

Embodiments of the present invention are explained herein using the example of combining a bilateral loop filtering operation with a SAO filtering operation. However, the invention is not limited to these specific examples. In general, the bilateral loop filtering operation may be combined with an ALF filtering operation, the deblocking filter, or any other filter. Additionally, the combining filter is not required to be a bilateral loop filter. For example, using the teachings herein, one of skill in the art may combine a Hadamard filter and SAO, Hadamard and ALF, or even SAO and ALF.

Figure 1:
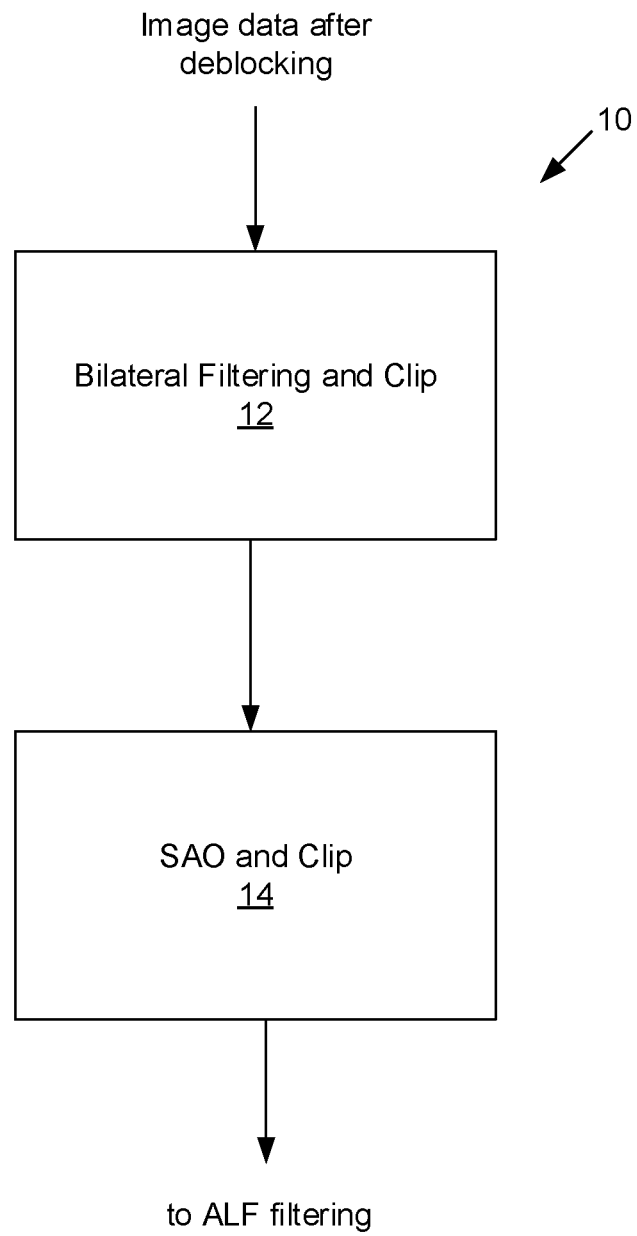
FIG. 1 is a block/flow diagram of a conventional method of image data filtering for a decoder.

FIG. 1 shows a traditional loop filter implementation 10 for a decoder, such as the ones described by Ström and Ikonin (cited above). In this case, the output from one of the filters 12 is used as input to the other filter 14. This is the situation with SAO and ALF in the current draft version of VVC—the output of SAO is used as input to ALF. In FIG. 1 the bilateral filter 12, with clipping, is first in the decoding chain, and the output is fed to the SAO filter 14, which also includes clipping.

As discussed above, this leads to problems with the implementation. Although it is possible to start processing part of the image with the first filter 12, and then process that part with the second filter 14 when the first filter 12 is finished with that part, this can lead to inefficiencies in the implementation if the two filters 12, 14 are working at different speeds on different parts of the image (or part of an image).

Figure 2:
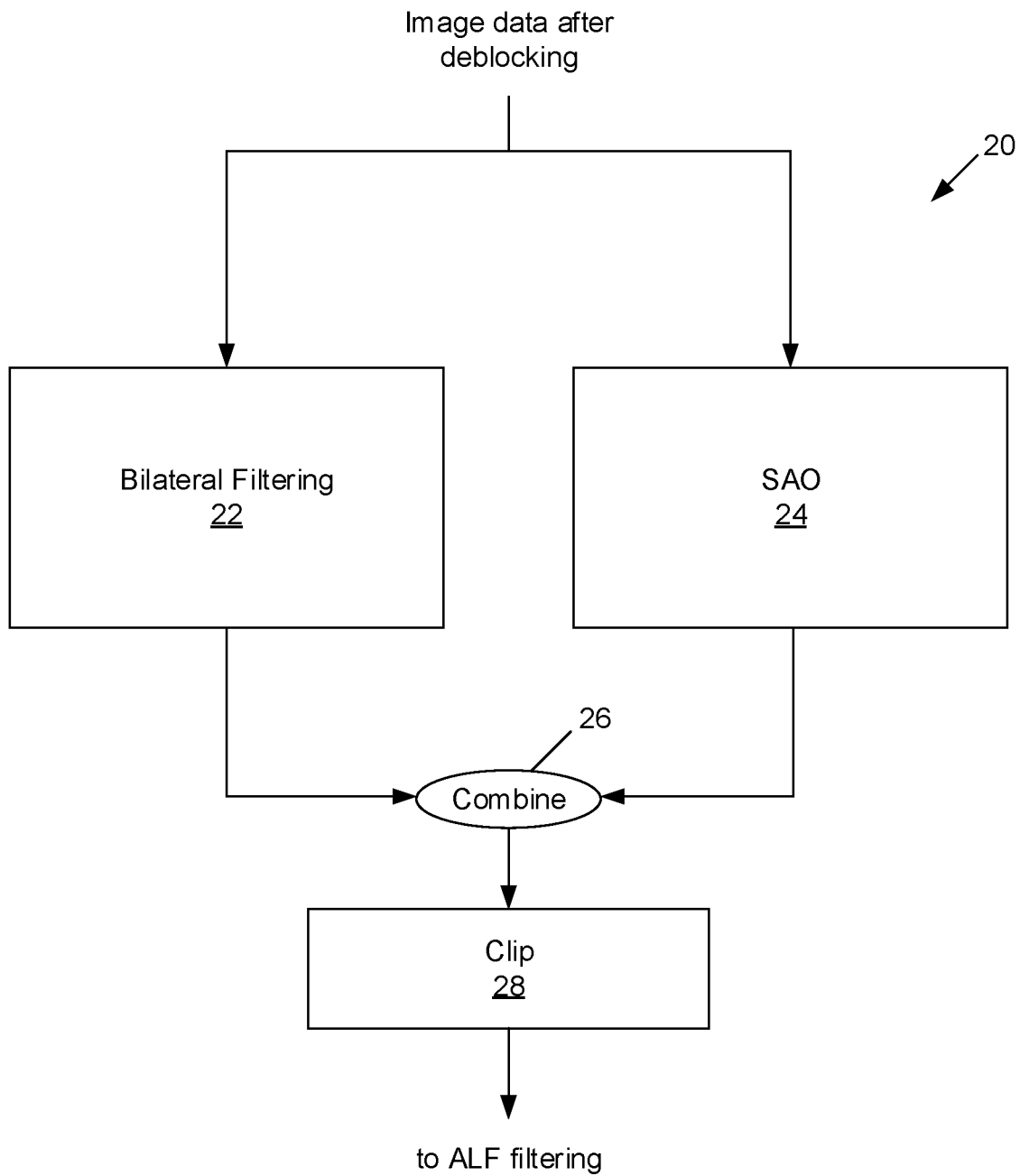
FIG. 2 is a block/flow diagram of a method of combined image data filtering.

FIG. 2 depicts a decoder filter implementation 20 according to embodiments of the present invention. In the embodiment 20, both the first filter 22 and the second filter 24 (here again, the bilateral filter 22 and SAO 24, as an example) receive the same image data. As indicated in FIG. 2, this input data may be image data after deblocking, but in general, it could be any input data, such as the image data before any loop filtering, or the image data after ALF. The outputs of the two filters 22, 24 are combined, such as at summer 26, and the result is then subject to a clipping operation 28.

Note that the first filter 22 and second filter 24 operate in parallel, by virtue of the fact that both filters 22, 24 operate on the same input image data. As detailed further herein, this image data may comprise an entire image, a large portion of an image such as a CTU, a smaller portion of an image such as a CU or TU, a smaller portion of an image such as a group of pixels, or even an individual pixel. Additionally, although the first filter 22 and second filter 24 operate in parallel, they may, but do not necessarily, do so simultaneously. That is, the same hardware may be re-used for each of the first 22 and second 24 filtering operations (for example, the output of one filtering operation 22, 24 may be saved while the other filtering operation 24, 22 is performed, and their outputs then combined 26 and clipped 28).

In greater detail, assume the input data are pixel intensities I(x,y), where I(x,y) represents the luma value (Y-value in YCbCr color space) of the sample located at pixel position (x,y). The bilateral filtering of such a sample is denoted as $$I_{BIF}(x,y)=BIF(I(x,y),I(x-1,y),Ix+1,y),Ix,y-1),I x,y+1), \ldots )\qquad\text{Eqn. 1}$$

where I(x−1,y), I(x+1,y), etc., are the intensity values of the samples surrounding pixel position I(x,y). For notational simplicity, this is abbreviated as $$I_{BIF}(x,y)=BIF(Ix,y))\qquad\text{Eqn. 2}$$

Likewise, a SAO-filtered version of I(x,y) is denoted as $$I_{SAO}(x,y)=SAO(Ix,y))\qquad\text{Eqn. 3}$$

although SAO filtering typically also depends on surrounding samples as well as parameters. These are not shown for simplicity.

The traditional filtering arrangement shown in FIG. 1 would yield:

$$I_{BIF}(x,y)=BIF(Ix,y))\qquad\text{Eqn. 4}$$

$$I_{BIFC}(x,y)=\text{clip}(I_{BIF}(x,y)) \qquad \text{Eqn. 5}$$

$$I_{SAO}(x,y)=SAO(I_{BIFC}(x,y)) \qquad \text{Eqn. 6}$$

$$I_{SAOC}(x,y)=\text{clip}(I_{SAO}(x,y)) \qquad \text{Eqn. 7}$$

where the function clip makes sure that the sample is still in its legal range, such as [0, 1023] for 10-bit data, and $I_{BIFC}$ and $I_{SAOC}$ represent clipped versions of $I_{BIF}$ and $I_{SAO}$, respectively. An example of the clip function can be clip(x)=max(0,min(1023,x)), although in general the output may be clipped to any arbitrary range. For example, in one embodiment, a minimum clipping value $c_{min}$ and maximum clipping value $c_{min}$ are signaled from an encoder to the decoder, and the clip then is performed using clip(x)=max($c_{min}$,min($c_{max}$, x)).

As discussed above, both filters 22, 24 receive the same input samples I(x,y):

$$I_{BIF}(x,y)=BIF(I(x,y)) \qquad \text{Eqn. 8.1}$$

$$I_{SAO}(x,y)=SAO(I(x,y)) \qquad \text{Eqn. 8.2}$$

In one embodiment, combining 26 these filter outputs comprises calculating the difference between each filtered sample and the input sample:

$$\Delta I_{BIF}(x,y)=I_{BIF}(x,y)-I(x,y) \qquad \text{Eqn. 9}$$

$$\Delta I_{SAO}(x,y)=I_{SAO}(x,y)-I(x,y) \qquad \text{Eqn. 10}$$

In this embodiment, the combined value $I_{COMB}$ is simply the input sample plus the two differences:

$$I_{COMB}(x,y)=I(x,y)+\Delta I_{BIF}(x,y)+\Delta I_{SAO}(x,y) \qquad \text{Eqn. 11}$$

In general, the filters 22, 24 may output image data (e.g., $I_{BIF}(x,y)$, $I_{SAO}(x,y)$), referred to herein as "filtered image data." Alternately, a filter 22, 24 may directly output the difference values (e.g., $\Delta I_{BIF}(x,y)$, $\Delta I_{SAO}(x,y)$), referred to herein as "delta data." In the latter case, of course, eqns. 9 and 10 are not necessary, and eq. 11 would operate directly on the filter 22, 24 outputs.

The final value is produced by clipping 28 the combined value $I_{COMB}$ $$I_{COMBC}(x,y)=\text{clip}(I_{COMB}(x,y)) \qquad \text{Eqn. 12}$$

It should be noted that if more than two filters are combined, clipping should not be applied until the outputs of all filters have been combined.

Note that, where both filters 22, 24 output filtered image data, it is not necessary to generate both delta data values. Rather, either delta may be added to the filtered image data of the other:

$$I_{COMB}(x,y)=I_{BIF}(x,y)+\Delta I_{SAO}(x,y) \qquad \text{Eqn. 13}$$

$$I_{COMB}(x,y)=\Delta I_{BIF}(x,y)+I_{SAO}(x,y) \qquad \text{Eqn. 14}$$

As mentioned above, many image processing filters are implemented such that they output delta data, not filtered image data. As an example, in the case of the bilateral filter in Ström's paper, the calculation for the final filtered pixel value is given by Equation 10 in that document:

$$I_F=I_C+((cm_{sum}+4)>>3) \qquad \text{(Eqn. 10 from Ström)}$$

where $I_C$ is the input pixel value, $I_F$ is the filtered pixel value (the output) and $cm_{sum}$ is a quantity that has been calculated in a previous step. Converting this to the notation used herein, it becomes:

$$I_{BIF}(x,y)=I(x,y)+((cm_{sum}+4)»3) \qquad \text{Eqn. 14.1}$$

Comparing this with Equation 9, it becomes clear that $\Delta I_{BIF}(x,y)$ must be equal to $((cm_{sum}+4)»3)$. Thus, for embodiments of the present invention in combination with the bilateral filter from Ström, it would be unnecessary to calculate $I_{BIF}(x,y)$ using Equation 14.1 and then immediately subtract I(x,y) again in order to obtain the desired quantity, which is $\Delta I_{BIF}(x,y)$. Instead, the calculation would be $\Delta I_{BIF}(x,y)=((cm_{sum}+4)»3)$, and this would be the output of the bilateral filter.

In general, a filtering operation may output filtered image data $I_{FILTER}(x,y)$, referred to herein as "filtered image data." Alternatively, the filtering operation may output a difference value such as $\Delta I_{FILTER}(x,y)$, referred to herein a "delta data." In particular, both the bilateral filter and SAO filter may be implemented to output delta data rather than filtered image data. For completeness and clarity of notation, in the former case, Equations 8.1 and 8.2 would be rewritten as:

$$\Delta I_{BIF}(x,y)=\Delta BIF(I(x,y)) \qquad \text{Eqn. 14.2}$$

$$\Delta I_{SAO}(x,y)=\Delta SAO(I(x,y)) \qquad \text{Eqn. 14.3}$$

where $\Delta BIF(I(x,y))$ denotes a version of the bilateral filter that outputs delta data, for instance $\Delta BIF(I(x,y))=((cm_{sum}+4)»3)$ in the case of Ström. Similarly, $\Delta SAO(I(x,y))$ denotes a version of the SAO filter that only outputs delta data—that is, the offset for each pixel rather than the offset plus the input. In this case, Equations 9 and 10 can be skipped and it is possible to directly calculate the combined value $I_{COMB}$ from the filter outputs, using Equation 11.

The embodiment 20 of FIG. 2 allows for great flexibility in computing $I_{COMBC}(x,y)$. As an example, it is possible to first calculate $\Delta I_{BIF}(x,y)$ and then later calculate $\Delta I_{SAO}(x,y)$. Another possibility is to calculate $\Delta I_{SAO}(x,y)$ first and then later calculate $\Delta I_{BIF}(x,y)$. Such a flexibility is valuable, for instance if one filter is faster on one part of the data and another filter is faster on another part of the data. With the embodiment 20 in FIG. 2 both can go at full speed and the filtering is never slower than the slowest filter. This is not possible with the arrangement of Equations 4-7 (FIG. 1). Assume for simplicity a very simple filter where $\Delta I_{BIF}(x,y)=4$ regardless of the input, and $\Delta I_{SAO}(x,y)=-5$. Following Equations 4-7 for an input value of I(x,y)=1020 gives $$I_{BIF}(x,y)=BIF(I(x,y))=1020+4=1024 \qquad \text{Eqn. 15}$$

$$I_{BIFC}(x,y)=\text{clip}(I_{BIF}(x,y))=\text{clip}(1024)=1023 \qquad \text{Eqn. 16}$$

$$I_{SAO}=SAO(I_{BIFC}(x,y))=1023-5=1018 \qquad \text{Eqn. 17}$$

$$I_{SAOC}=\text{clip}(I_{SAO}(x,y))=\text{clip}(1018)=1018 \qquad \text{Eqn. 18}$$

However, a decoder that calculates these in the opposite order will get to a different result:

$$I_{SAO}=SAO(I(x,y))=1020-5=1015 \qquad \text{Eqn. 19}$$

$$I_{SAOC}=\text{clip}(I_{SAO}(x,y))=\text{clip}(1015)=1015 \qquad \text{Eqn. 20}$$

$$I_{BIF}(x,y)=BIF(I_{SAOC}(x,y))=1015+4=1019 \qquad \text{Eqn. 21}$$

$$I_{BIFC}(x,y)=\text{clip}(I_{BIF}(x,y))=\text{clip}(1019)=1019 \qquad \text{Eqn. 22}$$

Although the error is only one intensity level, this will induce drift in the decoding process which can lead to unbounded errors. Hence, decoding must be bit-exact and it is not possible fora decoder to have a choice between Equations 15-18 and Equations 19-22. Indeed, in reality the situation is much worse than in this oversimplified example, since the functions BIF(I(x,y)) and SAO(I(x,y)) depend on the input in a non-linear way. This means that it would not be possible to reverse the order of Equation 15 and Equation 17, even if no clipping were done. However, in the parallel filter operation execution depicted in FIG. 2 and described herein with respect to Equations 8.1-12, it is possible to rearrange the order of computation.

Figure 3:
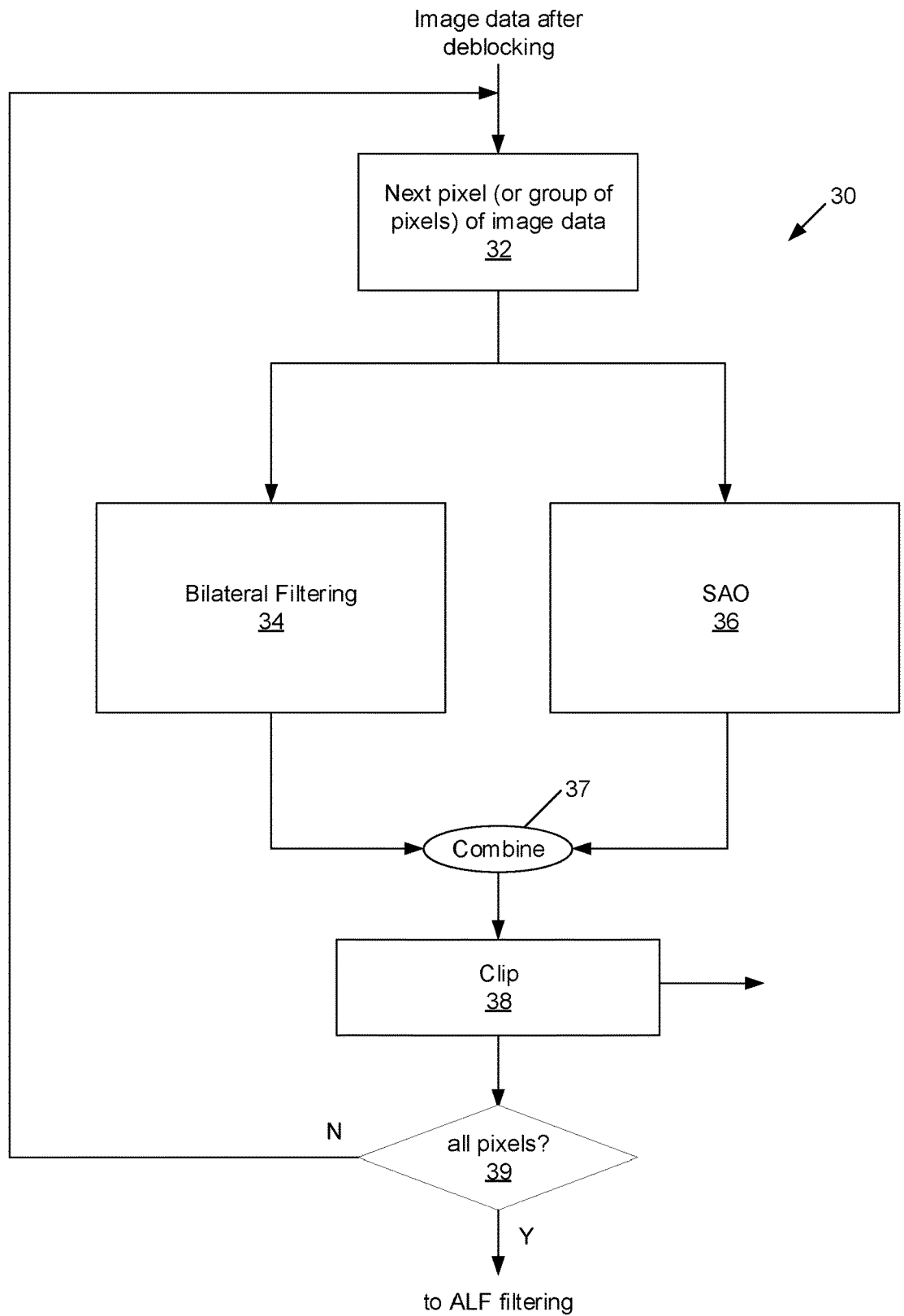
FIG. 3 is a block/flow diagram of an iterative method of combined image data filtering suitable for hardware implementation.

FIG. 3 depicts an embodiment 30 of a decoder that may be well suited for a hardware implementation. In this embodiment, the hardware implementation retrieves the next pixel (or group of pixels) 32, and applies a first filtering operation 34, such as a bilateral filter, and a second filtering operation 36, such as SAO. $\Delta I_{BIF}(x,y)$ and $\Delta I_{SAO}(x,y)$ are output by the filters 34, 36 or are calculated, and the filter 34, 36 outputs are combined 37 and clipped 38, e.g., using $I_{COMBC}=\text{clip}(I(x,y)+\Delta I_{SAO}(x,y)+\Delta I_{BIF}(x,y))$. The value $I_{COMBC}$ is then written to memory or passed on for further processing. The process repeats 39 over all available pixels (or pixel groups) in the image data 32. This iterative process avoids having the two filters 34, 36 get out of sync with one another, and makes it easier to dimension the clock frequency of the system.

Another advantage of the embodiment 30, from a hardware perspective, is that the BIF and SAO filters 34, 36 both use the same number of surrounding samples. The bilateral filter 34 proposed by Ström uses the following samples as input:

$$I_{BIF}(x,y)=BIF(I(x,y),I(x+1,y),I(x-1,y),I(x,y+1),I(x,y-1),I(x+1,y+1),I(x+1,y-1),I(x-1,y+1),I(x-1,y-1)).$$

The SAO filter 36 accesses the same pixels:

$$I_{BIF}(x,y)=SAO(I(x,y),I(x+1,y),I(x-1,y),I(x,y+1),I(x,y-1),I(x+1,y+1),I(x+1,y-1),I(x-1,y+1),I(x-1,y-1)).$$

In greater detail, SAO selects one of several filters, primarily three-sample filters:

$$SAO_{BO}(I(x,y))$$

$$SAO_{135}(I(x-1,y-1),I(x,y),I(x+1,y+1))$$

$$SAO_{90}(I(x,y-1),I(x,y),I(x,y+1))$$

$$SAO_{45}(I(x+1,y+1),I(x,y),I(x-1,y-1))$$

$$SAO_{0}(I(x-1,y),I(x,y),I(x+1,y))$$

Accordingly, SAO never accesses pixels outside of the ones utilized by BIF, and the opposite is also true—BIF never accesses pixels that SAO cannot utilize. Hence, the collection of pixels 32 is compatible between the filters 34, 36. For a hardware implementation, this means that the memory only needs to be read once and stored once—without buffers that take up expensive silicon surface area.

Figure 4:
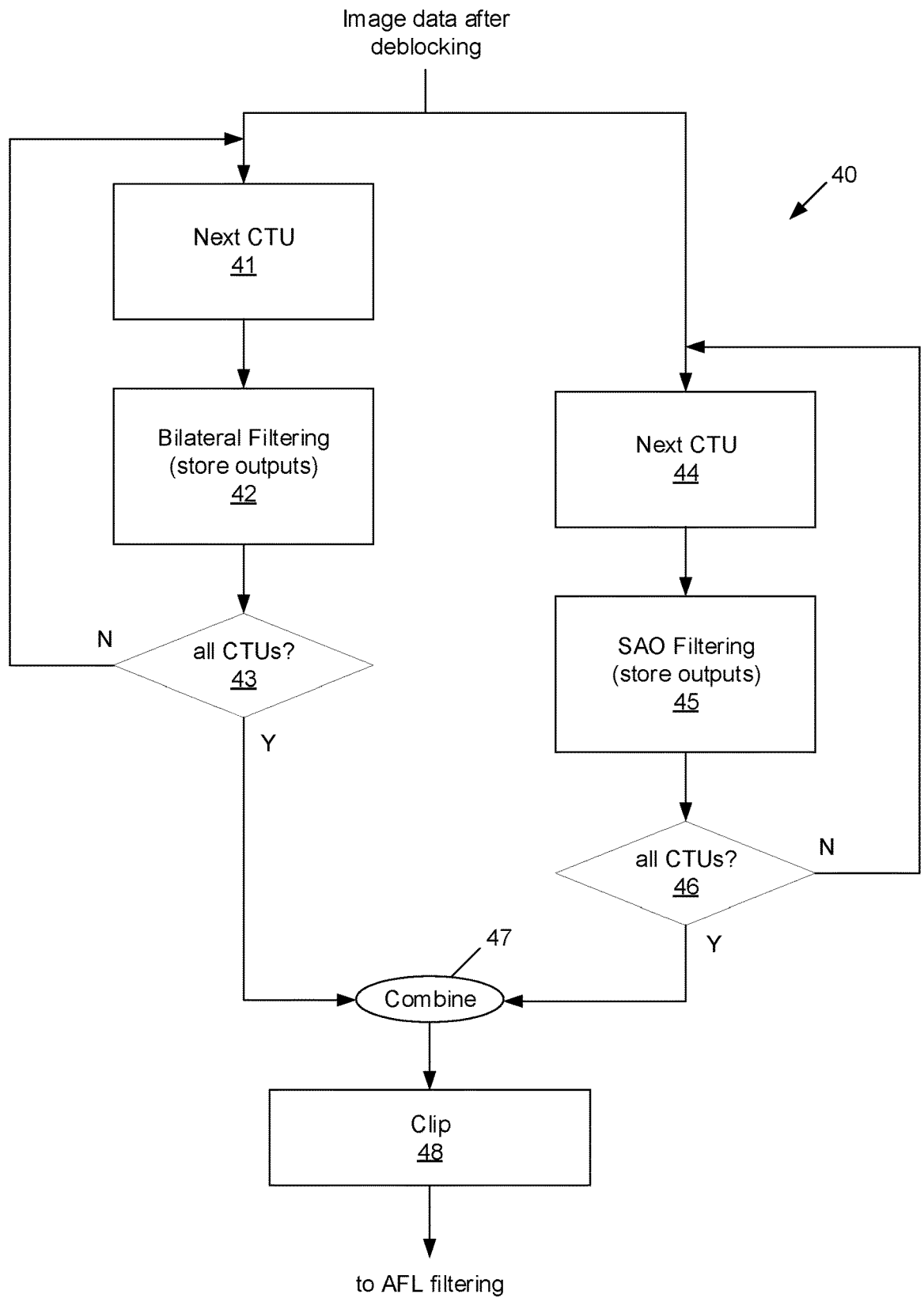
FIG. 4 is a block/flow diagram of a separately iterative method of combined image data filtering suitable for software implementation.

FIG. 4 depicts an embodiment 40 of a decoder that finds particular applicability where the first 42 and second 45 filtering operations are performed by executing software on a computational device, such as a digital signal processor (DSP) or a central processing unit (CPU). In this case, the filtering operations 42, 45 are typically executed on larger partitions of the image data, such as CTUs, which are typically 128×128 samples. For numerous reasons, it may be desired or required that the first 42 and second 45 filtering operations are performed sequentially, rather than simultaneously. Structurally, the filtering operations 42, 45 are still performed in parallel, as each receives the same image data as input. However, the two filtering operations 42, 45 cycle through the image data independently and at different times, each storing its output. These outputs are then retrieved as part of the combining operation 47. The combined outputs are then clipped 48, and passed on for downstream processing.

As one example, the CTUs of image data 41, 44 may comprise image data after deblocking. The process 40 may separately iterate through all CTUs 43 of image data, performing the bilateral filtering 42 and storing the outputs. The process 40 then again cycles through all CTUs 46 of the same image data, this time performing SAO filtering 45 and storing the outputs. The filtering operation 42, 45 outputs are then retrieved and combined 47, prior to clipping 48.

One reason that temporally separating the first 42 and second 45 filtering operations may be advantageous is to ease the task of writing software code to implement the filtering operations 42, 45, for example using Single Instruction Multiple Data (SIMD) code. As the name implies SIMD executes one instruction across multiple instances of data, such as pixels, providing a powerful means to develop very high-performing image processing software. However, the number of registers available in any particular computational device is finite, and it may not be possible to fit both of, e.g., bilateral filtering 42 and SAO filtering 45 in the same SIMD routine. Another reason is that the first 42 and second 45 filtering operations may not be coextensive in execution. For example, bilateral filtering 42 occurs over the entire image data, whereas SAO filtering 45 is turned off for some CTUs. Accordingly, the SAO filtering 45 may exit early and skip an entire CTU—something which is difficult to do if the filtering operations 42, 45 are combined at a per-pixel level.

Still further, the two filters may traverse the CTU in different ways in order to have an efficient implementation. As an example, a CTU is partitioned into smaller blocks called CUs, and they are in turn partitioned into smaller blocks called TUs. A typical size of a CTU can be 128×128 pixels, while for a TU it may be 8×8 pixels. For the bilateral filter, the parameters, such as the filter strength, are constant over a TU. Hence, if the bilateral filter processes the CTU by iterating over each TU independently, the implementation can be very efficient—the filter strength can be changed in the beginning of the sub-routine, and does not need to be altered every pixel. However, if the TU structure was neglected and the CTU processed line by line, it would be necessary to check in each pixel what the filter strength should be. This would make it very difficult to implement efficiently in SIMD code. As an example, in Ström, the filter strength is determined by the parameters k1 and k2, which depend on the qp (which is always the same in a TU) and on the TU size (which is naturally always the same within a TU). In contrast, the SAO filter has no dependencies on TU size, and it may therefore be more efficient to process the CTU line by line, since this may give caching advantages, given that images are often arranged line by line in memory.

Figure 5:
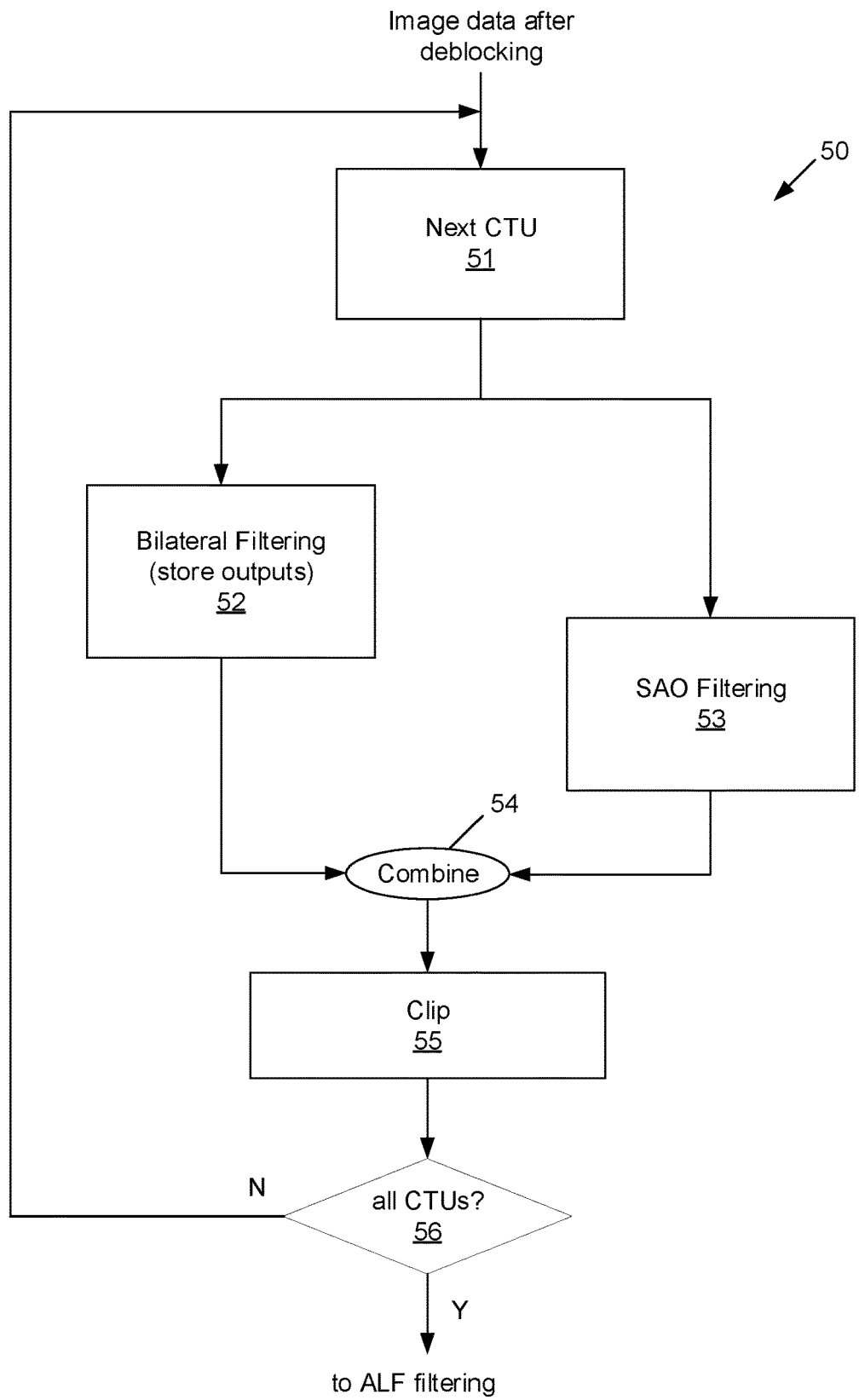
FIG. 5 is a block/flow diagram of an iterative method of separately combined image data filtering suitable for software implementation.

An alternative embodiment 50 is depicted in FIG. 5. In this embodiment, the second filtering operation 53, such as SAO, is always carried out after the first filtering operation 52, such as the bilateral filter. For every CTU 51, bilateral filtering 52 is first carried out on the entire CTU 51 using the image data after deblocking as input. The output from the bilateral filter 52 is then stored. Then SAO filtering operation 53 is carried out for the same CTU 51 using the image data after deblocking as input. For each pixel in the CTU 51, as soon as the SAO filtering operation 53 completes, the pixel is combined 54 with the corresponding pixel from the output of the bilateral filtering operation 52, clipped 55, and then stored. After this has been carried out for every pixel in the CTU 56, the method continues with the next CTU 51. An advantage of this embodiment 50 is that only one CTU 51 worth of bilateral filter 52 output needs to be stored, compared to a full image in the embodiment 40 of FIG. 4. Just as in FIG. 4, it is possible also in this embodiment 50 to traverse the pixels differently in the two filtering operations 52, 53. For instance, the first filtering operation 52 can traverse the CTU 51 TU-by-TU, whereas the second filtering operation 53 can traverse the CTU 51 line-by-line.

Figure 6:
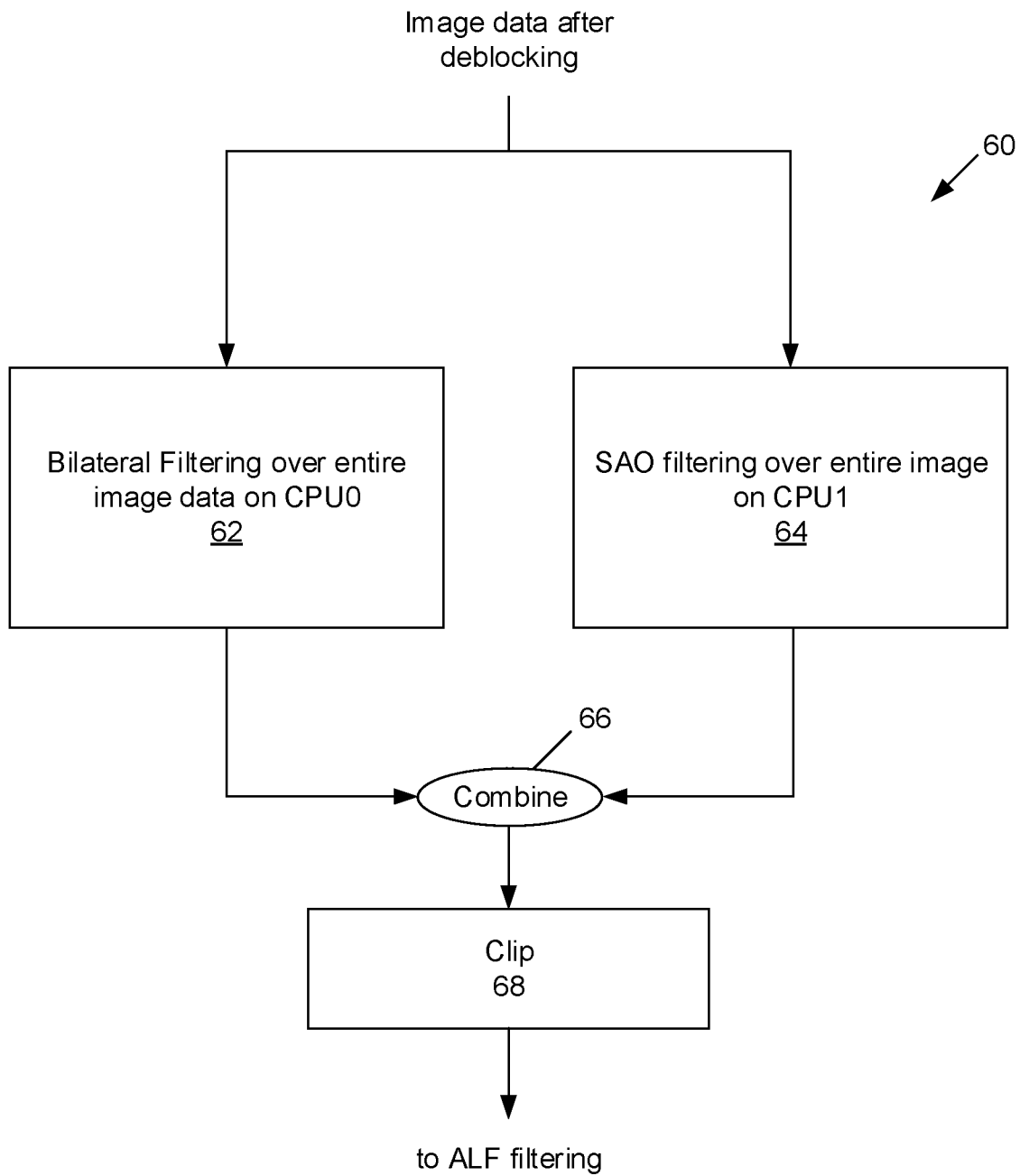
FIG. 6 is a block/flow diagram of a parallel, concurrent method of combined image data filtering implemented on multiple CPUs or CPU cores.

FIG. 6 depicts yet another embodiment 60 of a decoder, wherein separate processors, also referred to as CPUs (or separate cores in a single, multi-core CPU) each perform filtering operations 62, 64 over the entire image data. In this embodiment 60, the image data is "partitioned" into only one partition—the entire image. This data is then processed by the two computational engines, for example, CPU0 performing bilateral filtering 62 over the entire image data, and CPU1 performing SAO filtering 64 over the entire image data. The filtering operation 62, 64 outputs are then combined 66, clipped 68, and passed downstream for further processing. In some embodiments with very large image data, each processor may iteratively perform its filtering 62, 64 over very large partitions, which are less than the entire image data.

The filtering required for encoding image data is similar to that used in the decode, with some exceptions, such as the necessity to estimate parameters for some filters, such as SAO. Examples of such parameters include which of the filters $SAO_{BO}$, $SAG_0$, $SAO_{45}$, $SAO_{90}$, or $SAO_{135}$ to use, as well as deciding the offset strength.

Figure 7:
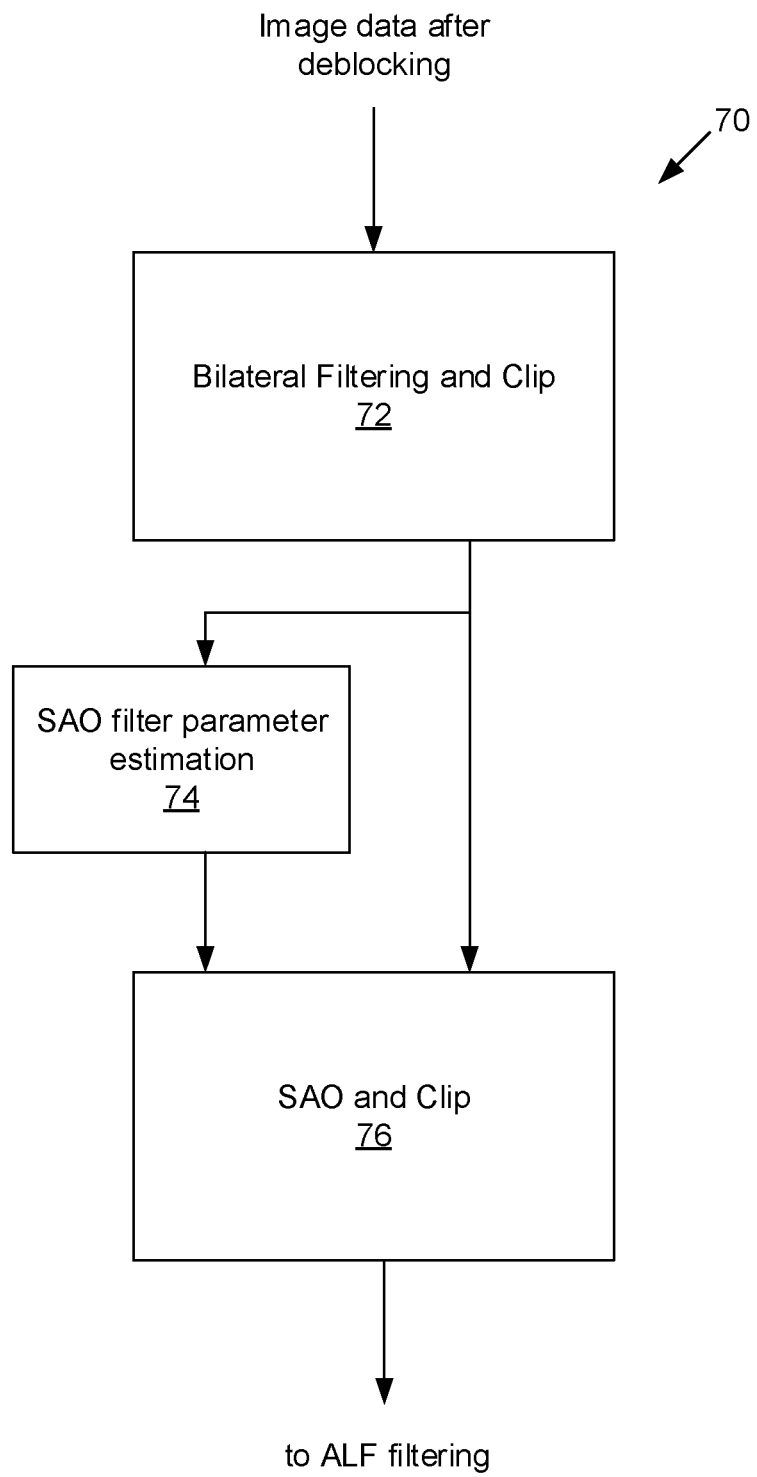
FIG. 7 is a block/flow diagram of a conventional method of image data filtering for an encoder.

FIG. 7 depicts a conventional approach 70 to encoding, wherein bilateral filtering and clipping 72 is performed on input image data (e.g., after deblocking). The filtered data are then used by SAO filter parameter estimation function 74 to estimate parameters for the SAO filter 76. The SAO filter 76 receives both the filtered image data from the bilateral filtering operation 72, and the parameters from the estimation function 74. The SAO filtering operation 76 includes clipping. The output of the SAO filtering operation 76 is then sent downstream, such as to ALF filtering. This approach suffers the same deficiencies as noted for the implementation 10 of FIG. 1—for example, discrepancies in execution speed of the two filtering operations 72, 76 can lead to inefficiencies.

Figure 8:
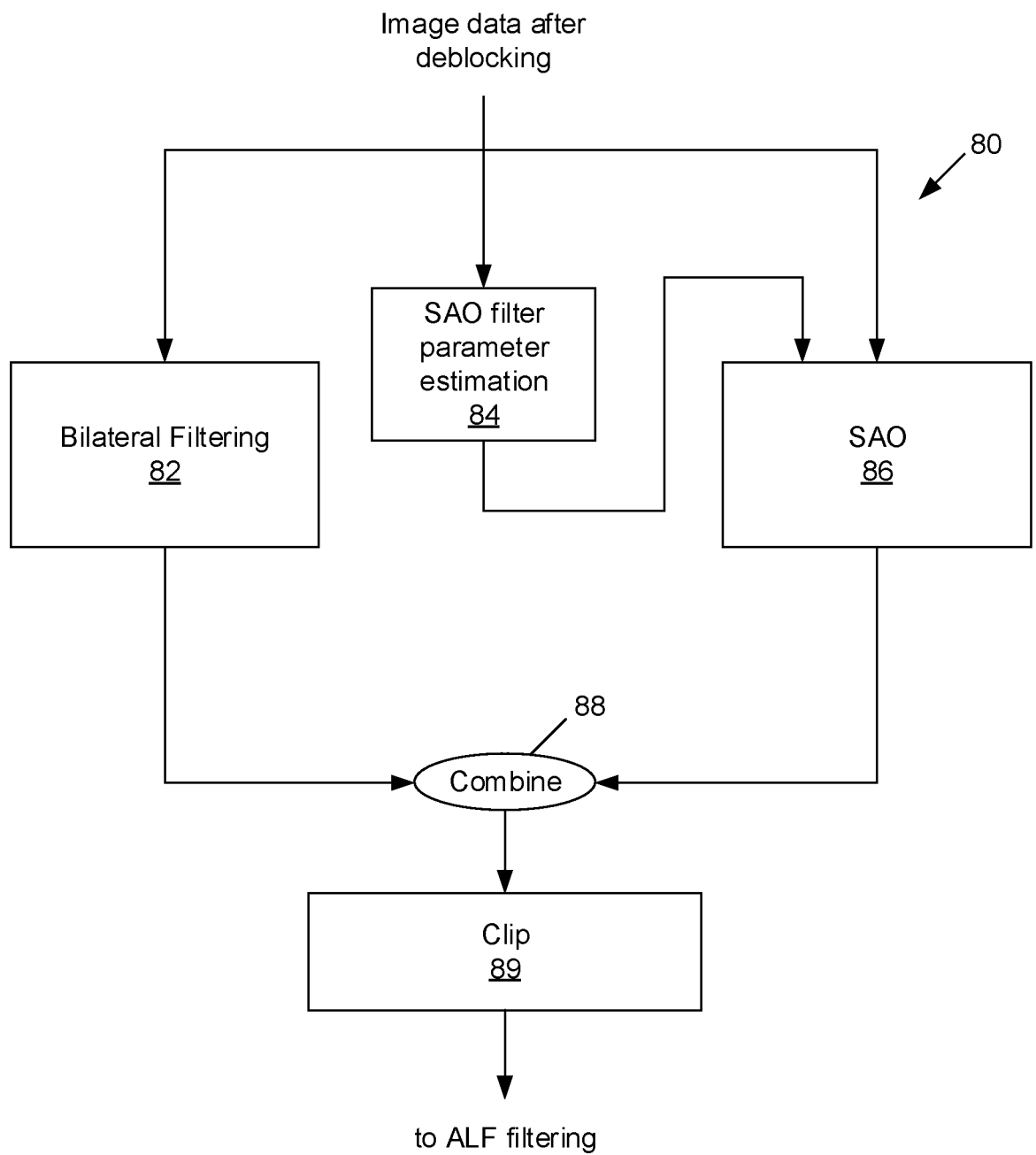
FIG. 8 is a block/flow diagram of a method of combined image data filtering according to one embodiment.

FIG. 8 depicts an embodiment 80 of combined filtering for an encoder, according to embodiments of the present invention. As in FIG. 2, both filtering operations 82, 86 operate on the same input image data, and hence are executed in parallel (although not necessarily simultaneously). The SAO filter parameter estimation function 84 also operates on the input image data, and provides parameters for the SAO filtering operation 86. The outputs of the first 82 and second 86 filtering operations are combined 88 and clipped 89, before being passed downstream for further processing.

In some respects, the embodiment 80 of FIG. 8 can be improved on. After processing, the combined image will contain bilateral filtering, but in the diagram in embodiment 80 of FIG. 8 the SAO parameter estimation box has no knowledge of the results of bilateral filtering. As an example, assume that the input intensity value I(x,y)=500 is too low in a pixel, compared to an original value 510, and should ideally be ten intensity levels higher. The bilateral filter may be able to completely correct for this by selecting $\Delta I_{BIF}(x,y)=10$. However, the SAO filter only receives the input I(x,y), which is ten levels too low, and may also correct for this by selecting $\Delta I_{SAO}(x,y)=10$. The result will then be a combined value $I_{COM}=I(x,y)+\Delta I_{BIF}(x,y)+\Delta I_{SAO}(x,y)=500+10+10=520$ which is 10 levels too high instead of ten levels too low—an overcorrection which is no better than the unfiltered pixel value I(x,y).

Figure 9:
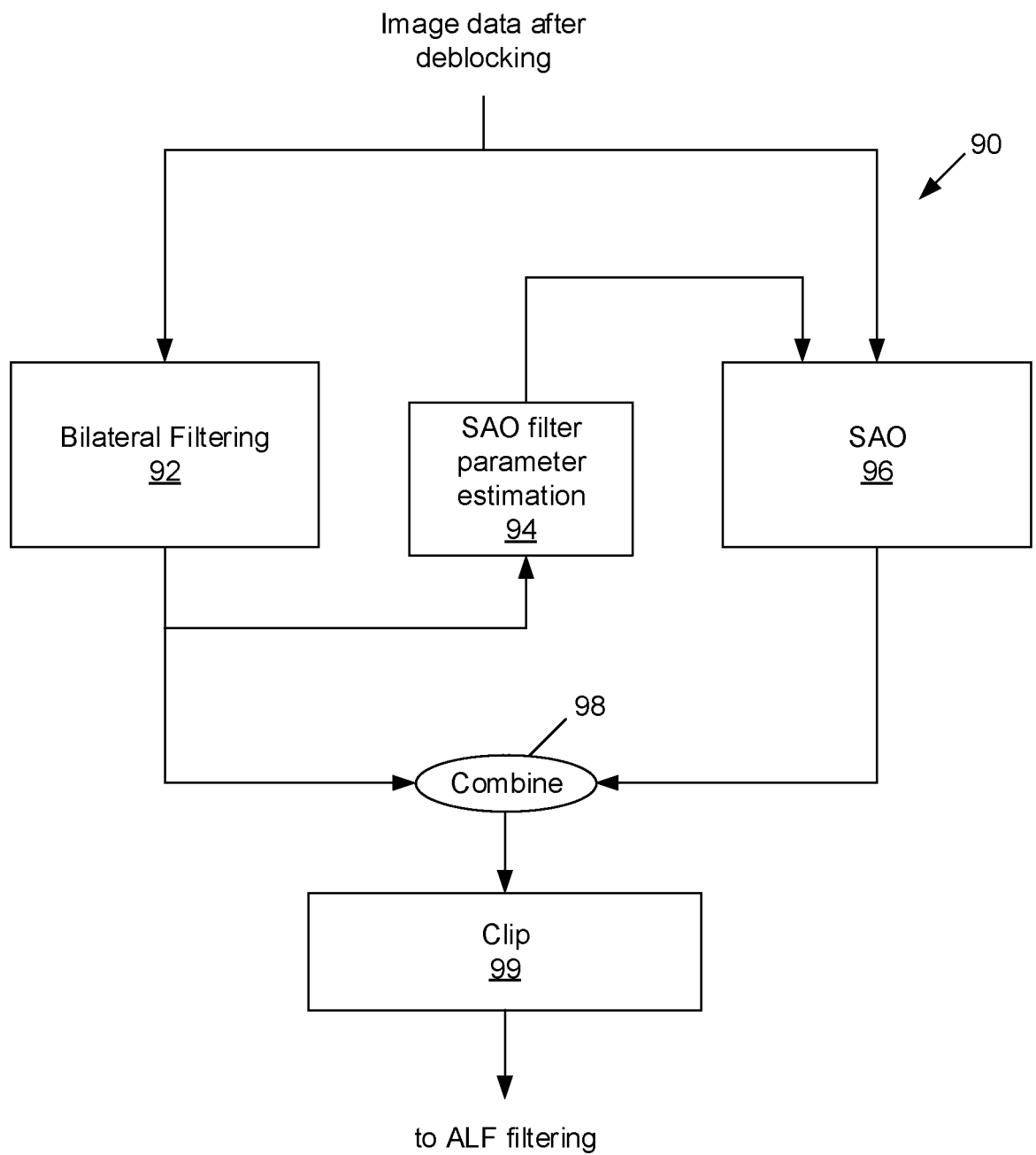
FIG. 9 is a block/flow diagram of a method of combined image data filtering according to another embodiment.

FIG. 9 depicts an embodiment 90 that addresses this deficiency. In the embodiment 90, the input image data (e.g., after deblocking) is first bilaterally filtered 92 and then sent to the SAO parameter estimation function 94. This is in contrast to the embodiment 80 depicted in FIG. 8, where the input image data was used as input to the SAO parameter estimation 84. By using the bilaterally filtered output as input, the SAO parameter estimation process 94 is aware of the corrections that the bilateral filter 92 has applied. Furthermore, in this arrangement the SAO filtering operation 96 uses the input image data (i.e., the same data as the bilateral filtering operation 92) as input. This is different from the traditional encoder as shown in FIG. 7, which uses the output of the bilateral filter 72 as input to the SAO filtering operation 76.

It should be noted that the performance of the two filtering operations 92, 96 may decrease slightly when using the arrangements depicted in FIGS. 2 and 9, compared to using the traditional methods shown in FIGS. 1 and 7. This is due to the fact that SAO filtering uses different inputs in its estimation step and its filtering step. However, according to measurements performed by the present inventors, this performance degradation is very small; the BD-rate declined from −0.43% to −0.42%. This should clearly be outweighed by the much greater flexibility obtained with embodiments of the present invention.

Another thing to notice is that even if the decoder uses filters that produces differences, such as $\Delta BIF(I(x,y))$ as described in eqn. 14.2 above, this type of filter cannot be used when providing input to the SAO parameter estimation process 94. The reason for this is that the SAO process 94 is expecting image data that can be directly compared with the original image data. Therefore, in one embodiment of the invention, the decoder may use a bilateral filter 92 that outputs delta data, $\Delta BIF(I(x,y))$, but the encoder may use a bilateral filter 92 that outputs filtered image data, $BIF(I(x,y))$, when producing input to the parameter estimation process 94 of the subsequent filter 96.

Although not explicitly depicted, the architecture of FIG. 9 is readily adapted to optimization for execution in hardware (similar to FIG. 3), software (similar to FIG. 4 or 5), or whole (or large) image processing by separate CPUs (similar to FIG. 6). Those of skill in the art will realize the extensions of these embodiments to the encoder case is straightforward.

The step of combining the filter outputs 26, 37, 47, 54, 66, 88, 98 is not limited to addition, as depicted at eqns. 9-11. In one embodiment, the combination may be multiplicative. In this embodiment, the ratios of filtered image data to image data are calculated, and the image data multiplied by these ratios. For example:

$$r_{BIF}(x,y)=I_{BIF}(x,y)/I(x,y) \quad \text{Eqn. 23}$$

$$r_{SAO}(x,y)=I_{SAO}(x,y)/I(x,y) \quad \text{Eqn. 24}$$

$$I_{COMB}(x,y)=I(x,y)*r_{BIF}(x,y)*r_{SAO}(x,y) \quad \text{Eqn. 25}$$

In one embodiment, to ensure avoidance of an operation that divides by zero, a constant offset α is used in the numerator and denominator:

$$r_{BIF}(x,y)=(I_{BIF}(x,y)+\alpha)/(I(x,y)+\alpha) \quad \text{Eqn. 23'}$$

$$r_{SAO}(x,y)=I_{SAO}(x,y)+\alpha)/I(x,y)+\alpha) \quad \text{Eqn. 24'}$$

$$I_{COMB}(x,y)=I(x,y)*r_{BIF}(x,y)*r_{SAO}(x,y) \quad \text{Eqn. 25}$$

In this manner, for example, the ratio $r_{BIF}(x,y)$ will approach a stable value when I(x,y) is close to or equals 0, rather than being unstable or undefined.

Figure 10:
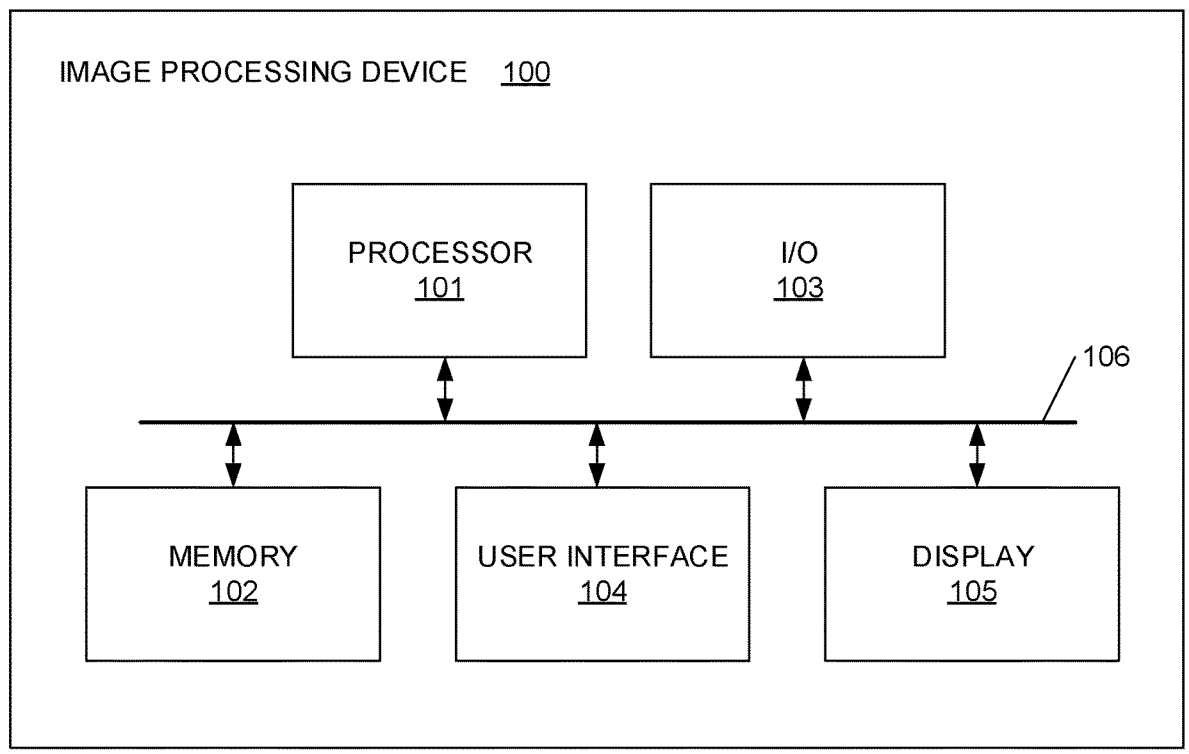
FIG. 10 is a block diagram of an image processing device.

FIG. 10 depicts a block diagram of an image processing device 100, which may implement embodiments of the present invention described and claimed herein. The image processing device 100 may comprise custom hardware optimized to perform image processing functions, including filtering operations. Alternatively, the image processing device 100 may comprise a general purpose computational device programmed to perform image processing functions, including filtering operations. In either case, the image processing device 100 may implement an image or video encoder, decoder, or both, as well as other functionality. In one embodiment, the image processing device 100 may include one or more processors 101, memory 102, Input/Output (I/O) circuitry 103, a user interface 104, and/or a display 105. These components are connected in data communication relationship by one or more buses 106. In some cases, some of these components may not be present or may be combined in various combinations with one another or with other components not shown. These components might be located in a single physical entity or in more than one physical entity. Any actions described herein as being taken by the processor 101 might be taken by the processor 101 alone or by the processor 101 in conjunction with one or more components shown or not shown in the drawing, such as a digital signal processor (DSP), graphic co-processor, or the like.

The processor 101 may comprise any one or more sequential state machines operative to execute machine instructions stored as machine-readable computer programs in the memory 102, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP); or any combination of the above. In some embodiments, the processor is a multi-core processor, which includes two or more processing cores or instruction execution pipelines, and is operative to execute two or more image filtering operations substantially simultaneously. In general, the processor 101 executes instructions, codes, computer programs, or scripts that it might access from memory 102, or from one or more devices (not shown) accessed via I/O circuitry 103. While only one processor 101 is shown, multiple processors may be present.

The memory 102 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. The memory may store image data to be processed, intermediate filter operation outputs, and combined filter operation outputs, as well as instructions for the processor(s) 101. Although depicted as a separate entity, those of skill in the art understand that many processors 101 include various forms of memory 102 (e.g., registers, cache, CAM, etc.).

The I/O circuitry 103 provides connectivity to and data communication/transfer with any number of external devices or interfaces. I/O circuitry 103 may take the form of one or more modems, modem banks, Ethernet devices, universal serial bus (USB) interface devices, serial interfaces, token ring devices, fiber distributed data interface (FDDI) devices, wireless local area network (WLAN) devices, radio transceiver devices such as 3G, 4G, or 5G wireless cellular network interface devices, worldwide interoperability for microwave access (WiMAX) devices, and/or other well-known devices for connecting to networks. The I/O circuitry 103 may enable the processor 101 to communicate with the Internet or one or more telecommunications networks or other networks from which the processor 101 might receive information or to which the processor 101 might output information.

Although many stand-alone, dedicated-purpose image processing devices 100 may have minimal or no user interface, in some embodiments, the image processing device 100 includes one or more user interfaces 104. These may include, for example, keyboards, keypads, switches, dials, mice, track balls, voice recognizers, touchscreens, and the like.

The display 105 may comprise any suitable display unit for displaying information appropriate for an image processing device 100. In addition, display 105 may be implemented as an additional user interface 104 device, such as a touch screen, touch panel, touch screen panel, or the like. Touchscreen technology allows a display 105 to be used as an input device, to remove or enhance a keyboard and/or mouse as primary input devices for interacting with content provided on the display 105. In one embodiment, for example, the display 105 may be implemented as a liquid crystal display (LCD) or other type of suitable visual interface. The display 105 may comprise, for example, a touch-sensitive color display screen.

Those of skill in the art will appreciate that, in any particular implementation, an image processing device 100 may include only some of the components and interfaces in depicted in FIG. 10. Conversely, FIG. 10 does not purport to depict an exhaustive list of circuits, and an image processing devices 100 may include many additional functions and features.

Figure 11:
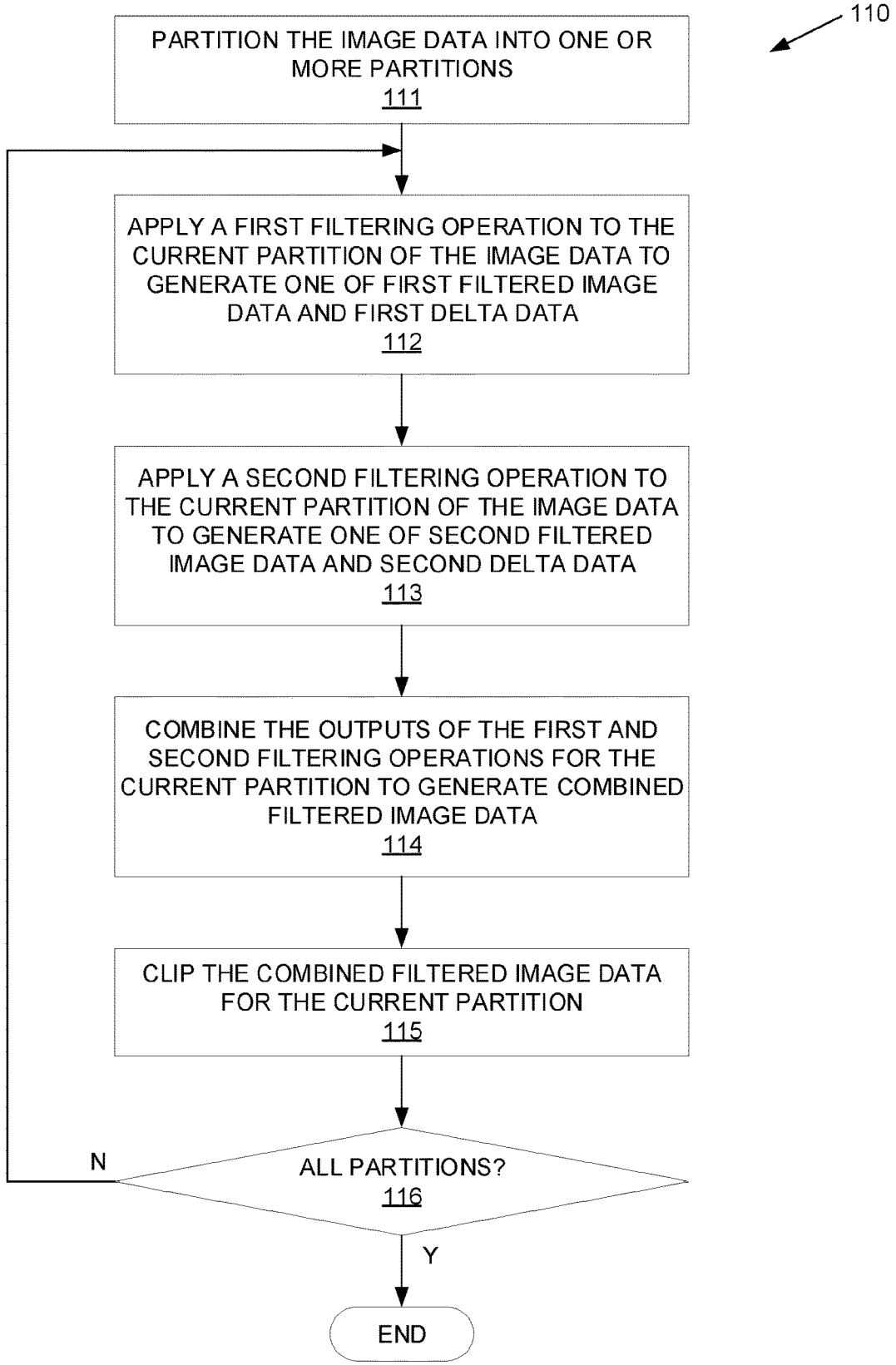
FIG. 11 is a flow diagram of a method of applying a plurality of disparate filter operations to image data.

FIG. 11 depicts a method 110 of applying a plurality of disparate filter operations to image data. The method 110 may, for example, execute as computer software on a processor 101 of an image processing device 100. Image data is partitioned into one or more data partitions (block 111). For each partition of the image data, a first filtering operation is applied to the current partition of the image data, to generate one of first filtered image data and first delta data (block 112). A second filtering operation is applied to the current partition of the image data to generate one of second filtered image data and second delta data (block 113). The outputs of the first and second filtering operations for the current partition are combined to generate combined filtered image data (block 114). The combined filtered image data for the current partition are clipped (block 115). This process repeats iteratively until all partitions of image data have been processed (block 116).

Embodiments of the present invention present numerous advantages over filtering methodologies known in the prior art. Combining a first filtering operation with second filtering operation lowers the implementation problem associated with too many loop filter stages that can get out of sync. Furthermore, it provides approximately the same compression efficiency gain as having a separate loop filter stage. Embodiments of the present invention also make it possible to select how tightly coupled the combined filters will be in the decoder or encoder implementation. For example, if a bilateral filter is combined with SAO filtering, a hardware implementation may choose to implement the decoding or encoding completely in lockstep, so that each sample is filtered using a bilateral filter and SAO together, then moving to the next sample, etc. However, a software implementation may prefer to instead to apply the bilateral filter first over an entire CTU, e.g., so that this can be made efficiently with SIMD instructions, and then apply SAO for the same CTU. It is even possible to first apply SAO and then the bilateral filter, with exactly the same result, which is crucial to avoid decoder drift. Furthermore, a CPU implementation may decide to filter the entire image with the bilateral filter on one CPU-core, while simultaneously performing SAO on the entire image on another CPU-core.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. As used herein, the term "adapted to" means set up, organized, configured, or arranged to operate in a particular way; the term is synonymous with "designed to." As used herein, the terms "about," "substantially," and the like, encompass and account for mechanical tolerances, measurement error, random variation, and similar sources of imprecision. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of applying a plurality of disparate digital image processing filter operations to image data, the method comprising:
    partitioning the image data into one or more partitions; and
    for each partition of the image data:
        applying a first digital image processing filtering operation to the partition of the image data to generate one of first filtered image data and first delta data comprising a difference between the image data and the first filtered image data;
        applying a second digital image processing filtering operation to the partition of the image data to generate one of second filtered image data and second delta data comprising a difference between the image data and the second filtered image data;
        combining the outputs of the first and second filtering operations for the partition to generate combined filtered image data by, for each partition of image data;
            if the first filtering operation generates first filtered image data, calculating first delta data as the difference between the image data and the first filtered image data;
            if the second filtering operation generates second filtered image data, calculating second delta data as the difference between the image data and the second filtered image data; and
            summing the image data, the first delta data, and the second delta data; and
        clipping the combined filtered image data for the partition.

2. The method of claim 1, further comprising:
    estimating one or more parameters for the second filtering operation based on the output of the first filtering operation;
    wherein applying the second filtering operation comprises applying the second filtering operation using the one or more estimated parameters.

3. The method of claim 2, wherein one of the estimated parameters indicates an extent of the partition of image data over which the second filtering operation is applied.

4. The method of claim 1, wherein each partition comprises one of:
    the entire image data, wherein the method comprises applying the first and second filtering operations to the entire image data;
    a coding tree unit (CTU), wherein the method comprises applying the first filtering operation to the CTU of image data at a first time and applying the second filtering operation to the CTU of image data at a second time, distinct from the first time;
    a group of pixels, wherein the method comprises applying the first and second filtering operations to the group of pixels; and one or more pixels, wherein the method comprises performing the first filtering, second filtering, combining, and clipping operations on each partition of image data prior to processing the next partition of image data.

5. The method of claim 1, wherein the combining the outputs of the first and second filtering operations for the partition comprises, for each partition of image data:
    if the first filtering operation generates filtered image data, calculating first delta data as the difference between the image data and the first filtered image data; and
    if the second filtering operation generates filtered image data, summing the first delta data with the second filtered image data.

6. The method of claim 1, wherein the combining the first filtered image data and second filtered image data for the partition comprises, for each partition of image data:
    calculating a first ratio of the first filtered image data and the image data;
    calculating a second ratio of the second filtered image data and the image data; and
    multiplying the image data by the first ratio and the second ratio.

7. The method of claim 6, wherein the method comprises calculating the first and second ratios as ratios of the respective first and second filtered image data and the image data offset by a constant value.

8. The method of claim 6, wherein the clipping the combined filtered image data comprises ensuring that the data are within a predetermined range.

9. The method of claim 1:
    wherein the first and second filtering operations comprise:
        post reconstruction bilateral filtering;
        bilateral loop filtering;
        post reconstruction Hadamard filtering;
        bilateral Hadamard filtering;
        deblocking filtering;
        sample adaptive offset (SAO) filtering;
        adaptive loop filter (ALF) filtering; and/or
        a combination thereof;
    wherein the first filtering operation comprises a bilateral filtering operation and the second filtering operation comprises a SAO filtering operation.

10. The method of claim 9, wherein the method follows a deblocking filtering operation and precedes an ALF filtering operation.

11. An image processing device configured to apply a plurality of disparate digital image processing filter operations to image data comprising input samples, the image processing device comprising:
    processing circuitry;
    memory containing instructions executable by the processing circuitry whereby the image processing device is operative to:
        partition the image data into one or more partitions; and
        for each partition of the image data:
            apply a first digital image processing filtering operation to the partition of the image data to generate one of first filtered image data and first delta data comprising a difference between the image data and the first filtered image data;
            apply second digital image processing filtering operation to the partition of the image data to generate one of second filtered image data and second delta data comprising a difference between the image data and the second filtered image data;
            combine the outputs of the first and second filtering operations for the partition to generate combined filtered image data by, for each partition of image data:
                if the first filtering operation generates first filtered image data, calculating first delta data as the difference between the image data and the first filtered image data;
                if the second filtering operation generates second filtered image data, calculating second delta data as the difference between the image data and the second filtered image data; and
                summing the image data, the first delta data, and the second delta data; and
            clip the combined filtered image data for the partition.

12. The image processing device of claim 11, wherein the instructions are such that the image processing device is operative to:
    estimate one or more parameters for the second filtering operations based on the output of the first filtering operation; and
    apply the second filtering operation by applying the second filtering operation using the one or more estimated parameters.

13. The image processing device of claim 11, wherein each partition comprises one of:
    the entire image data, wherein the instructions are such that the image processing device is operative to apply the first and second filtering operations to the entire image data;
    a coding tree unit (CTU) wherein the instructions are such that the image processing device is operative to apply the first filtering operation to the CTU of image data at a first time and apply the second filtering operation to the CTU of image data at a second time distinct from the first time;
    a group of pixels, wherein the instructions are such that the image processing device is operative to apply the first and second filtering operations to the group of pixels; and
    one or more pixels, wherein the instructions are such that the image processing device is operative to perform the first filtering, second filtering, combining, and clipping operations on each partition of image data prior to processing the next partition of image data.

14. The image processing device of claim 11, wherein the instructions are such that the image processing device is operative to combine the outputs of the first and second filtering operations for the partition by, for each partition of image data:
    if the first filtering operation generates filtered image data, calculating first delta data as the difference between the image data and the first filtered image data; and
    if the second filtering operation generates filtered image data, summing the first delta data with the second filtered image data.

15. The image processing device of claim 11, wherein the instructions are such that the image processing device is operative to combine the first filtered image data and second filtered image data for the partition by, for each partition of image data:
    calculating a first ratio of the first filtered image data and the image data;
    calculating a second ratio of the second filtered image data and the image data; and
    multiplying the image data by the first ratio and the second ratio.

16. The image processing device of claim 15, wherein the first and second ratios are calculated as ratios of the respective first and second filtered image data and the image data offset by a constant value.

17. The image processing device of claim 15, wherein the instructions are such that the image processing device is operative to clip the combined filtered image data so as to ensure that the data are within a predetermined range.

18. The image processing device of claim 11:
wherein the first and second filtering operations comprise:
  post reconstruction bilateral filtering;
  bilateral loop filtering;
  post reconstruction Hadamard filtering;
  bilateral Hadamard filtering;
  deblocking filtering;
  sample adaptive offset (SAO) filtering;
  adaptive loop filter (ALF) filtering; and/or
  a combination thereof;
wherein the first filtering operation comprises a bilateral filtering operation and the second filtering operation comprises a SAO filtering operation.

* * * * *